Sept. 18, 1962 N. B. COLEY ETAL 3,054,993
POSTING AND TRANSFER SYSTEM FOR DISPLAY INDICATORS
Original Filed Jan. 26, 1959 7 Sheets-Sheet 1

CODE TABLE

| DISPLAY INDICATOR POSITION NUMBERS | BUS WIRE NUMBERS | | | | |
|---|---|---|---|---|---|
| | 1 | 2 | 3 | 4 | 5 |
| 0 | + | o | + | + | o |
| 1 | o | + | + | + | o |
| 2 | o | + | o | + | + |
| 3 | o | o | + | + | + |
| 4 | + | o | + | o | + |
| 5 | + | o | o | + | + |
| 6 | + | + | o | + | o |
| 7 | + | + | o | o | + |
| 8 | o | + | + | o | + |
| 9 | + | + | + | o | o |

+ = BUS WIRE ENERGIZATION
o = BUS WIRE DEENERGIZATION

INVENTORS
N.B. COLEY, S.M. PHELPS
AND F.A. DALY
BY
*Forrest B. Hitchcock*
THEIR ATTORNEY Sept. 18, 1962 N. B. COLEY ETAL 3,054,993
POSTING AND TRANSFER SYSTEM FOR DISPLAY INDICATORS
Original Filed Jan. 26, 1959 7 Sheets-Sheet 2
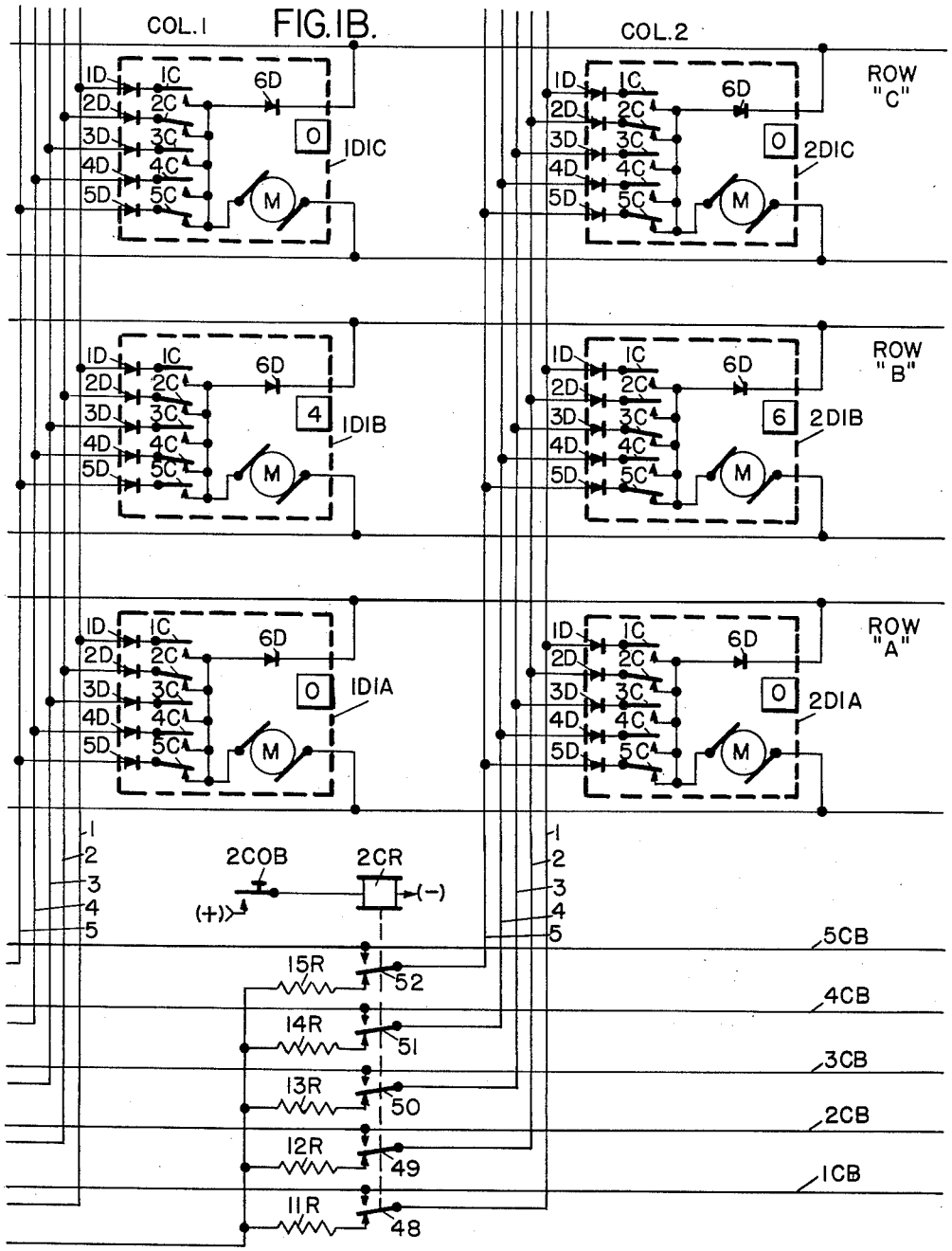
INVENTORS
N.B.COLEY, S.M.PHELPS
BY AND F.A.DALY
THEIR ATTORNEY Sept. 18, 1962   N. B. COLEY ETAL   3,054,993
POSTING AND TRANSFER SYSTEM FOR DISPLAY INDICATORS
Original Filed Jan. 26, 1959   7 Sheets-Sheet 3

FIG. 2C.

| DISPLAY INDICATOR POSITION NUMBERS | BUS WIRE NUMBERS | | | | | | | | | |
|---|---|---|---|---|---|---|---|---|---|---|
| | 1 | 2 | 3 | 4 | 5 | 6 | 7 | 8 | 9 | 0 |
| 1 | O | + | + | + | + | + | + | + | + | + |
| 2 | + | O | + | + | + | + | + | + | + | + |
| 3 | + | + | O | + | + | + | + | + | + | + |
| 4 | + | + | + | O | + | + | + | + | + | + |
| 5 | + | + | + | + | O | + | + | + | + | + |
| 6 | + | + | + | + | + | O | + | + | + | + |
| 7 | + | + | + | + | + | + | O | + | + | + |
| 8 | + | + | + | + | + | + | + | O | + | + |
| 9 | + | + | + | + | + | + | + | + | O | + |
| O | + | + | + | + | + | + | + | + | + | O |

+ = BUS WIRE ENERGIZATION
O = BUS WIRE DEENERGIZATION

FIG. 2A.

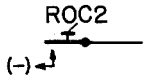
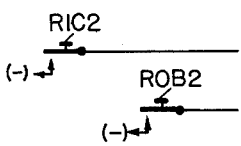
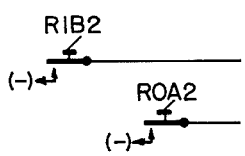
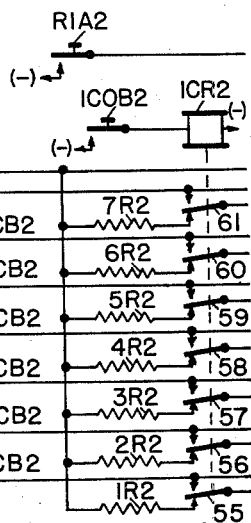
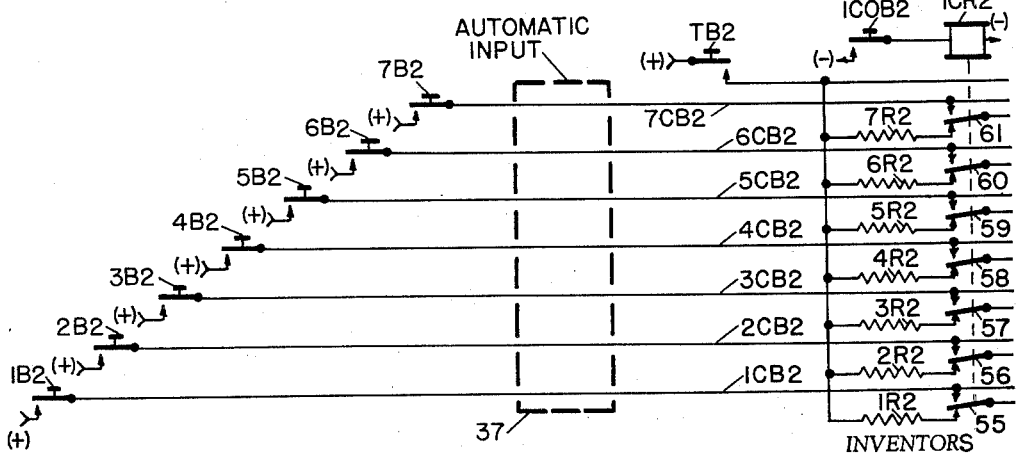

INVENTORS
N. B. COLEY, S. M. PHELPS
AND F. A. DALY
BY
Forest B. Hitchcock
THEIR ATTORNEY Sept. 18, 1962 N. B. COLEY ETAL 3,054,993
POSTING AND TRANSFER SYSTEM FOR DISPLAY INDICATORS
Original Filed Jan. 26, 1959 7 Sheets-Sheet 4
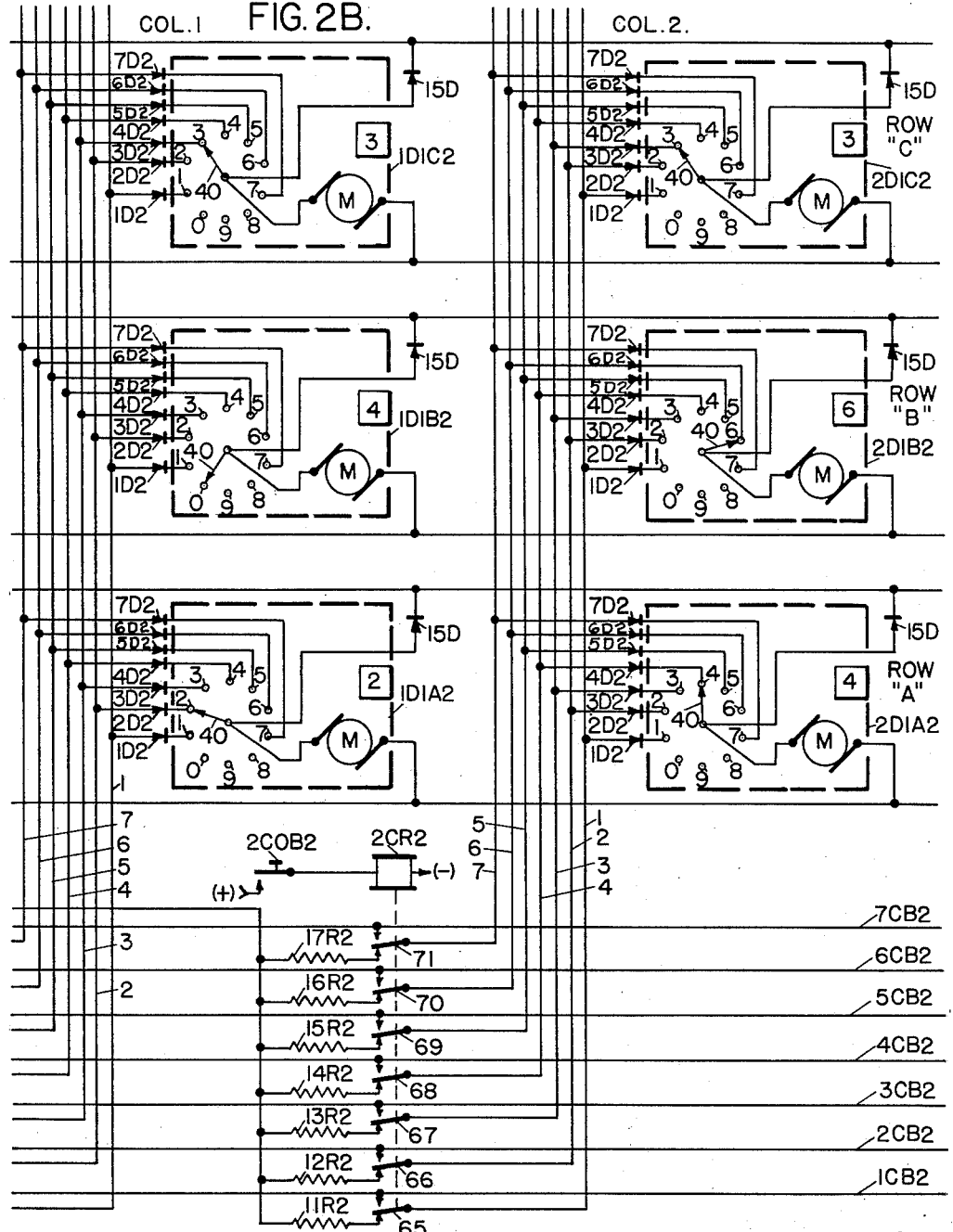
INVENTORS
N.B. COLEY, S.M. PHELPS
AND F.A. DALY
BY
Forest B. Hitchcock
THEIR ATTORNEY

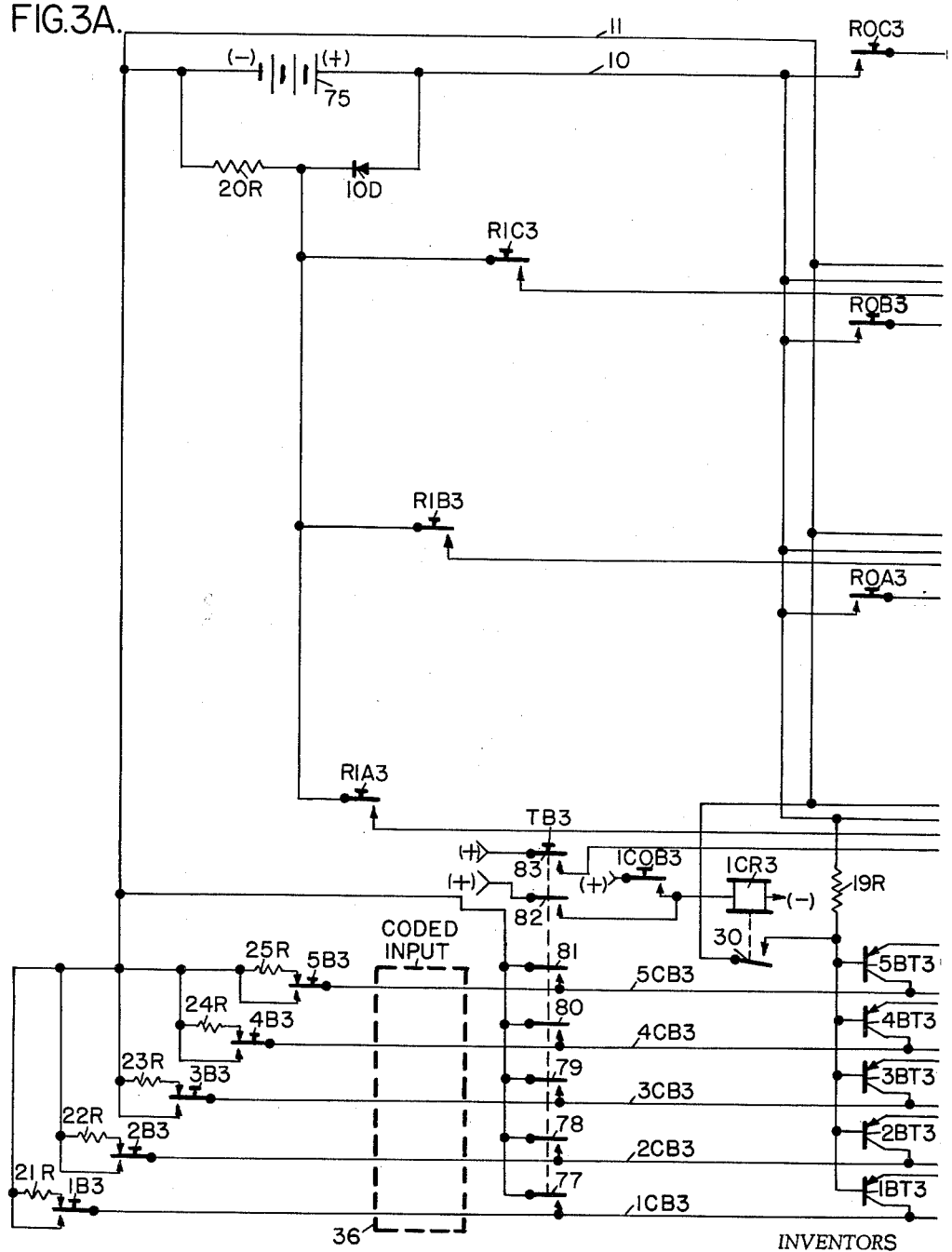

Sept. 18, 1962 N. B. COLEY ETAL 3,054,993
POSTING AND TRANSFER SYSTEM FOR DISPLAY INDICATORS
Original Filed Jan. 26, 1959 7 Sheets-Sheet 6

INVENTORS
N.B. COLEY, S.M. PHELPS
AND F.A. DALY
BY
THEIR ATTORNEY

United States Patent Office 3,054,993
Patented Sept. 18, 1962

3,054,993
POSTING AND TRANSFER SYSTEM FOR
DISPLAY INDICATORS
Nelson B. Coley, Rush, and Stuart M. Phelps and Frank A. Daly, Rochester, N.Y., assignors to General Railway Signal Company, Rochester, N.Y.
Continuation of application Ser. No. 789,139, Jan. 26, 1959. This application Nov. 29, 1961, Ser. No. 157,041
22 Claims. (Cl. 340—324)

This invention relates in general to a posting and transfer system for display indicators, and more particularly pertains to such a system in which any selected indicator of a large number may be positioned in accordance with the selective energization of a set of buses and in which the position of that selected indicator may be directly transferred to any one of the other indicators over the same set of buses.

This application is a continuation of our prior application Ser. No. 789,139, filed January 26, 1959.

In some prior systems, the positioning of any selected indicator is effected by the selective energization of a particular one of a plurality of buses, or the energization of all of the plurality of buses except a selected one of such plurality. Also, prior systems have employed a set of buses selectively energized in code combinations for positioning selected indicators. Such a system employing buses selectively energized in code combinations reduces the number of buses required below the number of positions that each display indicator may assume.

However, such prior systems for posting information in display indicators have usually required intermediate switching means for transferring the position of one indicator to any selected different indicator of the posting system. The present invention proposes that the position of any selected indicator may be directly transferred to any other selected indicator over the same set of buses employed for originally positioning such indicators regardless of whether the posting system employs buses respectively related to the different positions of the indicator or whether the buses are energized in code combinations.

It is further proposed in accordance with the present invention to accomplish the above mentioned posting and transfer operations in a manner requiring a minimum amount of apparatus without objectionable feed-around circuits and in a manner to effectuate reliable operation of the display indicators.

A further purpose of the present invention is to provide such a posting and transfer system of operation in a manner to reduce the energy requirements for the bus control system. It is particularly desirable to reduce the operating energy for the display indicators so as to reduce the possibility of failure of its commutator contacts. More specifically, it is proposed to accomplish these purposes by the use of transistors appropriately located in the circuits.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which:

FIGS. 1A and 1B illustrate a posting and transfer control system for a number of display indicator devices, which system employs selective energization of the control buses in code combinations;

FIG. 1C is a code table representing the bus wire energizations required for operating the display indicators of FIGS. 1A and 1B to their different positions;

FIGS. 2A and 2B illustrate a posting and transfer system for a number of display indicator devices having control buses respectively related to the different positions of the display indicator devices;

FIG. 2C is a code table representing the bus wire energization required for operating the display indicators of FIGS. 2A and 2B to their different positions;

FIGS. 3A and 3B illustrate another form of posting and transfer control system for display indicator devices similar to that shown in FIGS. 1A and 1B but incorporating means for reducing the energy requirements and simplifying the contact arrangements.

Figures 1A, 1C:
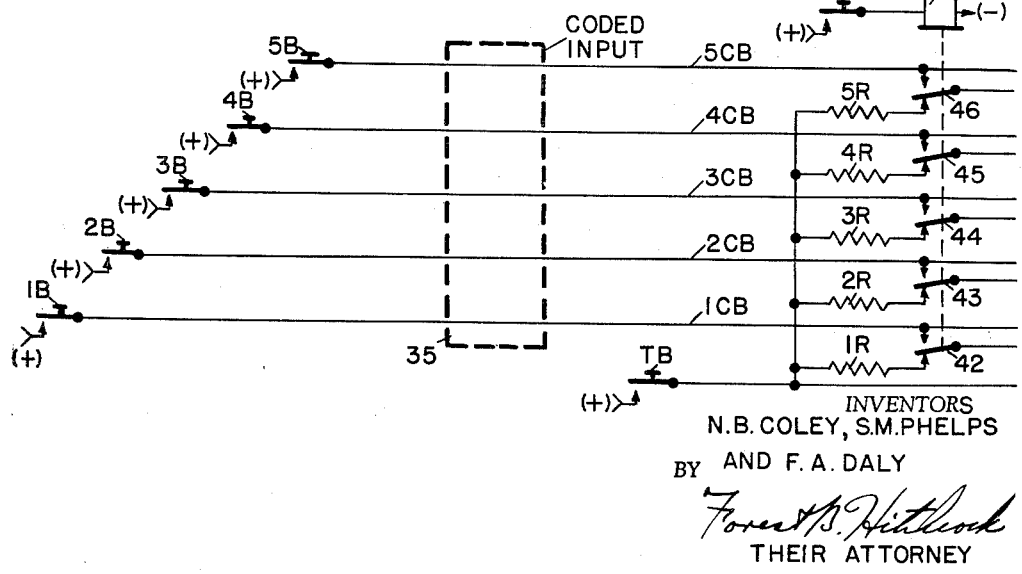

For the purpose of simplifying the illustration and facilitating the explanation, the various parts and circuits constituting the embodiment of the invention have been shown diagrammatically and certain conventional illustrations have been employed, the drawings having been made more for the purpose of making it easy to understand the principles and mode of operation, than with the idea of illustrating the specific construction and arrangement of parts that would be employed in practice. Thus, the various relays and their contacts are illustrated in a conventional manner, and symbols are used to indicate other devices and the terminals of batteries or other sources of electrical current instead of showing all the wiring connections.

The symbols (+) and (−) are employed to illustrate the positive and negative terminals respectively of suitable batteries or other sources of direct current, and the circuits with which these symbols are used always have current flowing in the same direction. In some instances, the actual source is symbolically illustrated in order to show the relativity of all of the connections.

The disclosures shown in the drawing have been prepared to show that the principles of posting and transfer disclosed herein may be usable with any type of changeable indicator display organization regardless of whether such system receives information locally or over some form of communication system. For this reason, some of the functions required for the posting control have been shown diagrammatically as accomplished manually but it should be understood that any or all of such functions may be effected automatically either by local control or by remote control employing a suitable form of communication system. These characteristic features will be explained more in detail in the following description.

STRUCTURE OF FIG. 1

A plurality of display indicators DI are shown as arranged in columns and rows. For convenience the columns have been numbered and the rows have been given letters. These indicator units may be of any suitable type, but for convenience are assumed to be of the general type shown in the G. E. Marsh Patent No. 2,959,773, granted on November 8, 1960. It should, of course, be understood that the indicators to be used for coded bus control as shown herein may require slight modification as to their contacts or commutator arrangements. A particular commutator arrangement suitable for use herein has been shown in detail in the N. B. Coley U.S. patent application Ser. No. 763,493, filed September 26, 1958, and a similar structure has also been shown in the co-pending U.S. application of W. D. Maynard, Ser. No. 763,569, filed September 26, 1958. For consideration of the operation, it is assumed that these indicators are of the ten position type employing a commutator similar to that shown in said above mentioned Coley application Ser. No. 763,493.

Each of these indicators, assumed to be ten position indicators, is operated to its different positions by a motor M through suitable reduction gearing which operates the display element and the commutator portions. The commutator portions have brushes which in effect provide five contacts as diagrammatically illustrated in FIG. 1 for each of the indicators. These contacts assume different positions for each of the different positions of the indicator in code combinations. In brief, the combinations are so chosen that to operate an indicator requires that three buses be energized for each of the combinations selected for the ten positions and two buses are left deenergized. This is shown in the Code Table of FIG. 1C.

In this code table of FIG. 1C, the (+) symbol is used to indicate the bus wires for the desired position that must be energized to operate the indicator to such position; and the (0) symbol represents the corresponding bus wires for that position which are deenergized. When bus wires are energized in a particular combination, the indicator which is being operated continues such operation until the contacts for those bus wires are opened and the remaining contacts are closed. Thus, in effect, the symbols (+) in the code table of FIG. 1C also indicates that for the corresponding position the corresponding contacts of an indicator are open.

Also, the ten different positions of the indicator have been represented in the code table of FIG. 1C as numerals, and these numerals may also be displayed by the display indicator in the corresponding positions. However, it should be understood that for the different positions of the indicators any letter or symbol may be used on the display tape of the indicators as may be desired.

The buses 1, 2, 3, 4 and 5 are connected through five diodes 1D, 2D, 3D, 4D and 5D respectively to the commutator contacts of the indicator. These diodes are for the purpose of preventing feed-around circuits as will be later discussed.

An additional diode 6D is employed for each indicator to prevent feed-around circuits in connection with the read-out and read-in operations subsequently to be explained.

For convenience in the disclosure, the rows of indicators have been given letters and the columns have been given numerals. By combining these letters and numerals with the reference characters DI for any particular indicator, it is possible to readily note its location in the display panel.

The control buses 1CB, 2CB, 3CB, 4CB and 5CB may be energized in the combinations shown in the Code Table either by the manually operable buttons 1B, 2B, 3B, 4B and 5B or by a suitable coded input automatic control means 35. When these buses are thus energized in accordance with the position desired for some indicator either in column 1 or in column 2, the appropriate column relay, such as relay 1CR, is energized either by the manual operation of the button 1COB or appropriate automatic control (not shown). The particular row is then determined by the operation of an appropriate read-in contact, such as the manually operable contact RIB, which contact may also be automatically closed by suitable control means (not shown), if desired. In any event, regardless of whether the inputs and indicator selections are effected manually or by automatic control means, the circuits are maintained completed until the selected indicator has completed its operation, as will be discussed later.

For the purpose of transferring the position of one indicator to another, a transfer button TB common to the entire panel is shown as being manually operable. Likewise, the read-out button, such as button ROC for row C, may be manually operated to have the positions of the indicators 1DIC and 2DIC transferred to the indicators 1DIA and 2DIA respectively. To do this the read-in button RIA also has to be manually operated. Again it should be noted that the read-in and read-out contacts may be controlled by suitable automatic means concurrently with the automatic operation of the transfer button if desired. After the information has been transferred from one row to another, the row from which such information has been transferred may be returned to zero or a blank position, or may be operated to have new information all dependent upon the controls which are applied to the control buses and the operation of the appropriate read-in apparatus.

In addition to the apparatus above described, a resistor is included in each of the operating buses for each column. These resistors have been designated 1R, 2R, 3R, 4R, 5R, 11R, 12R, 13R, 14R and 15R. Their function is to convert the bus energization from a general condition to a specific position identifying condition as governed by the particular indicator from which the read-out information is to come. This function will be discussed in greater detail hereinafter.

OPERATION OF FIGS. 1A and 1B

By referring to the Code Table of FIG. 1C, it will be noted that for any position of any particular indicator certain bus wires must be energized. When that indicator has assumed such position, its contacts corresponding to such bus wires are then opened. Thus, by observing the opened or closed condition of the contacts associated with each of the display indicators, it is possible to determine its existing position. This is indicated by the symbol in the rectangular opening illustrated at the right of each indicator.

Let us assume that suitable control information, either automatic or manual, is set up to apply positive energy from (+) through control buttons 2B, 4B and 5B, to control buses 2CB, 4CB and 5CB for the combination representing indicator position No. 2 as shown in the Code Table of FIG. 1C. In order to operate the indicator 1DIC, it is necessary to have the read-in button RIC operated to apply (−) to one terminal of its motor M. Also, the column button 1COB must be operated to energize the column relay 1CR causing it to be picked up to close front contacts 42, 43, 44, 45 and 46. In this condition, energy flows through the motor M of the indicator 1DIC until its contacts assume positions corresponding to those required for position No. 2 to open the circuit from the buses 2, 4 and 5 to remove (+) from the other terminal of the motor. When it has reached a proper position, the control contacts 2B, 4B, 5B and RIC can be opened.

Let us assume that we wish to operate the indicator 2DIC to its position No. 5. This requires the energization of control buses 1CB, 4CB and 5CB by the operation of control buttons 1B, 4B and 5B. Also, operation of column button 2COB energizes the column relay 2CR to close its front contacts 48, 49, 50, 51 and 52. Also, the read-in contact RIC must be closed. This causes energy to flow from (+) through the closed control button contacts, the appropriate control buses, the contacts of this indicating device 2DIC, the motor M, and the read-in contact, to (−), until its contacts are in proper positions to open connections to the energized buses for that position. Its motor M is then deenergized and the control contacts above mentioned may be opened.

Let us now assume that it is desired to transfer the positions just posted in the indicating devices 1DIC and 2DIC to the indicators 1DIA and 2DIA. To perform this operation, the transfer button TB must be operated to connect (+) to the common terminals of the resistors 1R, 2R, 3R, 4R, 5R, 11R, 12R, 13R, 14R and 15R. The read-out contact ROC is operated to connect (−) through the diodes 6D of indicators 1DIC and 2DIC to the common point between their respective motors M and their commutator contacts. This means that the energy applied to the transfer bus by the transfer contact TB is then shorted with respect to the column buses through the indicator contacts that are closed for row C. More specifically, the indicator device 1DIC is in a position having its contacts 1 and 3 closed. This means that sufficient current flow takes place through the resistors 1R and 3R of column buses 1 and 3 to produce a potential drop such that upon the connection of the motor M to such buses there is insufficient potential to operate the motor of an indicator device. Since there is no potential drop in the remaining three resistors for that column, there is sufficient potential on the corresponding buses to operate the motor for any indicator in that column for which a read-in button is operated.

Assuming that the read-in button RIA is actuated, then the motor M of indicator 1DIA is energized because its associated contacts are standing in the position 0. As the motor operates the indicator through its different positions, the motor M continues to be energized until such contacts assume positions corresponding to those required for position No. 2, but cannot operate past that position because the other buses, i.e. buses 1 and 3 do not have sufficient potential to operate the motor M because of the potential drop in resistors 1R and 3R caused by the closure of the read-out button ROC.

Concurrently with the transfer operation just described, a similar transfer operation is taking place between the display indicator 2DIC and the display indicator 2DIA. It will be apparent that potential drops are similarly produced in the resistors 12R and 13R by the actuation of the read-out button ROC.

At the end of this transfer operation, the read-out and read-in control contacts for the respective rows are of course open and the transfer button TB is opened. Thus, the display indicators are now setting in positions where the same information is present in rows A and C. It is readily apparent that the indicators of row C may be restored to zero positions or may be operated to other positions by the appropriate energization of the control buses and actuation of the various control contacts as above described for a regular posting operation.

In the above operation, it will be noted that the read-out connections for all of the indicators in row C become common at the contact of the read-out button ROC. A similar common connection is provided for the read-out circuits for each of the other rows. Each indicator is provided with a diode 6D in its portion of such common connection to prevent erroneous feed-around circuits between the buses for the several columns.

In addition, it will be noted that there is a common connection between one terminal of each motor of the indicators for row C and the contact of the read-in button RIC. A similar common connection is provided for the motors of the indicators for each of the other rows. The diodes 1D, 2D, 3D, 4D and 5D for each indicator in addition to preventing undesired cross feeds between the buses for any column due to the use of indicators having contacts which assume different code combinations for its different positions, also serve to prevent cross feeds between the buses of different columns through the common connections of the motors for any row.

STRUCTURE OF FIGS. 2A AND 2B

A plurality of display indicators DI of the ten position individually motor driven type are shown as arranged in columns and rows. For convenience, the columns have been numbered and the rows have been given letters. Also, the number 2 has been placed to the right of the reference characters to designate these indicators as belonging to FIG. 2. Thus, the display indicator in the upper left-hand corner of the panel is designated 1DIC2 since it is an indicator of column 1, row C, FIG. 2B.

These display indicators may be of any suitable type, but for convenience are assumed to be of the general type shown in the G. E. Marsh Patent No. 2,959,773, granted on November 8, 1960, in which each indicator is individually driven by its own electric motor to its different positions. Obviously, such indicators could take different forms and different gear structures. Also, the indicators contemplated to be used in this embodiment of the present invention are assumed to be of the multiple position type having a contact individual to each of its different positions. Thus, the contact arrangement of the above mentioned Marsh patent would require certain modifications to provide a single contact closure for each of its different positions, but this is believed to be fully within the scope of one skilled in the art. In FIG. 2B, the indicators are illustrated as having ten position contacts; but only seven of these contacts are shown as connected to the buses. However, it is to be understood that all ten contacts are assumed to be employed involving ten buses, but the other three buses have been omitted for the sake of simplicity in the disclosure.

The display indicators are designated in FIG. 2C as having numerical positions, in which positions the different indicators may display corresponding numerical symbols or may display any suitable symbols desired for the particular circumstances in practice such as letters or other symbols.

Each of these indicators, assumed to be ten position indicators, is operated to its different positions by a motor M through suitable gearing which operates the display element and the contact arrangement. The ten positions which the indicator may assume are provided by means of a contact arm or commutator arrangement sequentially making contact at its ten different positions. With this type of structure, energy must be applied to the contacts of all of the positions of the indicator except that position to which it is desired to operate such indicator. This will be more apparent by referring to the bus energization table of FIG. 2C. With reference to this table, for example, the position 2 of the indicator will be obtained when such indicator has responded to energy applied to every bus except the bus for position No. 2.

As typical of the bus control system contemplated, seven control buses 1CB2, 2CB2, 3CB2, 4CB2, 5CB2, 6CB2 and 7CB2 common to all columns are shown as energizable either by the manually operable buttons 1B2, 2B2, 3B2, 4B2, 5B2, 6B2 and 7B2 or by other suitable automatic input control means 37. When these buses are energized in accordance with the position required for some indicator either in column 1 or in column 2, the appropriate column relay such as relay 2CR2 is energized either by the manual operation of button 2COB2 or appropriate automatic control means (not shown). The particular row is then determined by actuation of its associated read-in button such as button RIA2 for row A. The control circuits are maintained closed until the selected indicator has completed its operation, as will be discussed later, regardless of whether the inputs and indicator selections are effected manually or by automatic means.

For the purpose of transferring the position of one indicator to another indicator in the same column, a transfer button TB2 is shown as being manually operable. Likewise, the read-out button such as button ROA2 for row A may be manually operated to effect the transfer of the positions of indicators 1DIA2 and 2DIA2 to indicators 1DIB2 and 2DIB2 respectively. To accomplish this, the read-in button RIB2 must also be operated. It should be noted that the read-in and read-out contacts may be controlled by automatic means, if desired. After the particular positions have been transferred from one row to another row, the row from which such transfer has occurred may be operated to a different position in accordance with the input control and its particular read-in control.

The resistors 1R2, 2R2, 3R2, 4R2, 5R2, 6R2, 7R2, 11R2, 12R2, 13R2, 14R2, 15R2, 16R2 and 17R2 have been included in the transfer circuit in similar manner to that of FIGS. 1A and 1B. Their function is to convert the bus energization from a general condition to a specific condition identifying position of the particular indicator from which the read-out information is to come. This particular operation will be discussed in greater detail hereinafter.

It should be noted that each of the indicators has associated therewith a group of diodes, one for each position of the indicator and connected in the circuit between the contacts for the different positions and the column buses. More specifically, the indicator 1DIA2 has diodes 1D2, 2D2, 3D2, 4D2, etc., associated with it. These diodes are for the purpose of preventing certain undesired feed-around circuits due to the common connection between the motors M for any row and the read-in button such as button RIA2 for that row.

It is also noted that the read-out buttons, such as button ROA2 for each row have common connections to the indicators. Each indicator therefore has associated in such common connection a suitable diode, such as diode 15D, to prevent feed-around circuits between the buses of the different columns.

OPERATION OF FIGS. 2A AND 2B

By referring to the bus energization table of FIG. 2C, it may be determined that the bus wire having no energy applied thereto is indicative of the particular display position allotted to that particular selective energization of input control buses. Each of the display indicators shown in FIG. 2B are assumed to be in a particular position designated by their contact arms.

Let us assume that it is desired to position the indicator 1DIA2 to its position 4 to display the digit 4 from its present position 2. Referring to the table of FIG. 2C, this requires the energization of buses 1, 2, 3, 5, 6, and 7 by their associated buttons 1B2, 2B2, 3B2, etc., or suitable automatic input means. The actuation of read-in button RIA2 and column button 1COB2 are also necessary to be able to read-in to row A and column 1.

More specifically, the picking up of the column relay 1CR2 closes front contacts 55, 56, 57, 58, 59, 60 and 61 to connect the buses 1, 2, 3, etc., of column 1 to their respective control buses 1CB2, 2CB2, 3CB2, etc. The positive energy selectively applied to the buses is capable of flowing through the respective diodes 1D2, 2D2, 3D2, etc., for the several positions of the indicator. The indicator 1DIA2 is shown in position 2 so that positive energy from the bus 2 flows through the contact 40 and motor M of the indicator through the contact of the read-in button RIC2. This operates the indicator to position 3. Positive (+) energy on bus 3 similarly operates the motor M until the indicator is in position 4. In this particular instance, the bus 4 is not receiving positive energy so that the indicator stops in such position. It might be well to note in this connection that if the indicator 1DIA2 had been in position 5, it would have required operation through all of its successive positions 6, 7, 8, 9, 0, 1, 2 and 3 to reach the position 4. This would have been entirely possible because all of the buses would have been energized except the bus 4. After the indicator 1DIA2 has completed its operation, the read-in button RIA2, the column button 1COB2, and the control buttons 1B2, 2B2, 3B2, etc., are released. This restores the system to its normal conditions in readiness for positioning some other indicator.

Let us assume that it is desired to position the indicator 2DIA2 to position 5 to display the digit 5. This requires the energization of buses 1, 2, 3, 4, 6, 7, etc. which may be energized by their associated buttons 1B2, 2B2, 3B2, etc., or other suitable automatic input means. It is necessary, in this case, to actuate read-in button RIA2 and column button 2COB2. These buttons are again sustained in an actuated position until the indicator 2DIA2 has assumed its called for position. The operation in this instance is the same as just described above for the indicator 1DIA2 except that the column relay 2CR2 has closed its front contacts 65, 66, 67, 68, 69, 70, 71, etc. to supply positive energy to all of the column buses except the bus 5. This means that the motor M of the indicator 2DIA2 will receive energy for its operation whenever the arm 40 is in any position other than the position 5. This assures that the indicator can be operated from any position to any other position. At the completion of its operation, the read-in button RIA2, the column button 2COB2, and the control buttons 1B2, 2B2, 3B2, 4B2, etc., are released restoring the system to its normal condition ready either for another posting operation or a transfer operation as may be desired.

Let us assume that it is desired to transfer the new positions of indicators 1DIA2 and 2DIA2 to indicators 1DIB2 and 2DIB2 respectively. In this instance, it is necessary to actuate read-in button RIB2 and read-out button ROA2. The transfer button TB2 is also actuated so as to apply positive energy (+) to one side of each of the resistors 1R2, 2R2, 3R2, 4R2, 5R2, 6R2, 7R2, 11R2, 12R2, 13R2, 14R2, 15R2, 16R2 and 17R2 located in the columns 1 and 2.

Assuming the proper control conditions which have been above described for the transfer of the positions of indicators 1DIA2 and 2DIA2 to indicators 1DIB2 and 2DIB2 have been established, such transfer will take place in the following manner. In the case of indicator 1DIA2, a complete circuit will be established from (+), through transfer button TB2, resistor 4R2, back contact 58 of relay 1CR2, diode 4D2, contact arm 40 in position 4, diode 15D, read-out button ROA2, to (−). The current in this circuit establishes a potential drop in resistor 4R2 which is effective to render the column bus wire 4 at substantially a negative potential. Each of the remaining nine column bus wires 1, 2, 3, 5, 6, 7, etc., are at a positive potential. Thus, indicator 1DIB2 will operate until the contact arm 40 of this indicator reaches position 4, at which point its motor M will be deenergized because bus 4 is at negative potential.

The transfer of the position from indicator 2DIA2 to indicator 2DIB2 will occur in like manner concurrently with the transfer from indicator 1DIA2 to 1DIB2. In this instance, however, resistor 15R2 has a potential drop across it due to contact arm 40 of indicator 1DIA2 being in position 5. The motor M of indicator 2DIB2 will be deenergized when the contact arm 40 of this indicator reaches position 5. The indicator 2DIB2 will thus display the digit 5. Each of the control buttons are then returned to their normal positions for further use as desired.

The indicators 1DIA2 and 2DIA2 will remain in their respective positions until such time that it is desired to read-in other information into these two indicators. This is accomplished in the manner as previously described.

From the above description it can be seen that the position of any indicator can be read-out into another indicator by appropriately changing the energization of the buses from a general condition to a specific condition. This is accomplished merely by shorting such bus to the negative terminal of the battery source to produce a potential drop in that bus so that such bus in effect is deenergized so far as the controlling of the indicator to which the position is to be transferred. It is thus apparent that this same principle of operation is applicable to individual bus control as well as to buses selectively energized in code combinations.

STRUCTURE OF FIGS. 3A AND 3B

A plurality of display indicators DI are shown as being arranged in columns and rows, which columns have been numbered and which rows have been given letters. The number 3 has also been placed to the right of the reference characters to designate that these indicators belong to FIGS. 3A and 3B. Thus, the display indicator in the upper left-hand corner of the panel is designated 1DIC3 since it is an indicator of column 1, row C, FIG. 3B.

Figure 3B:
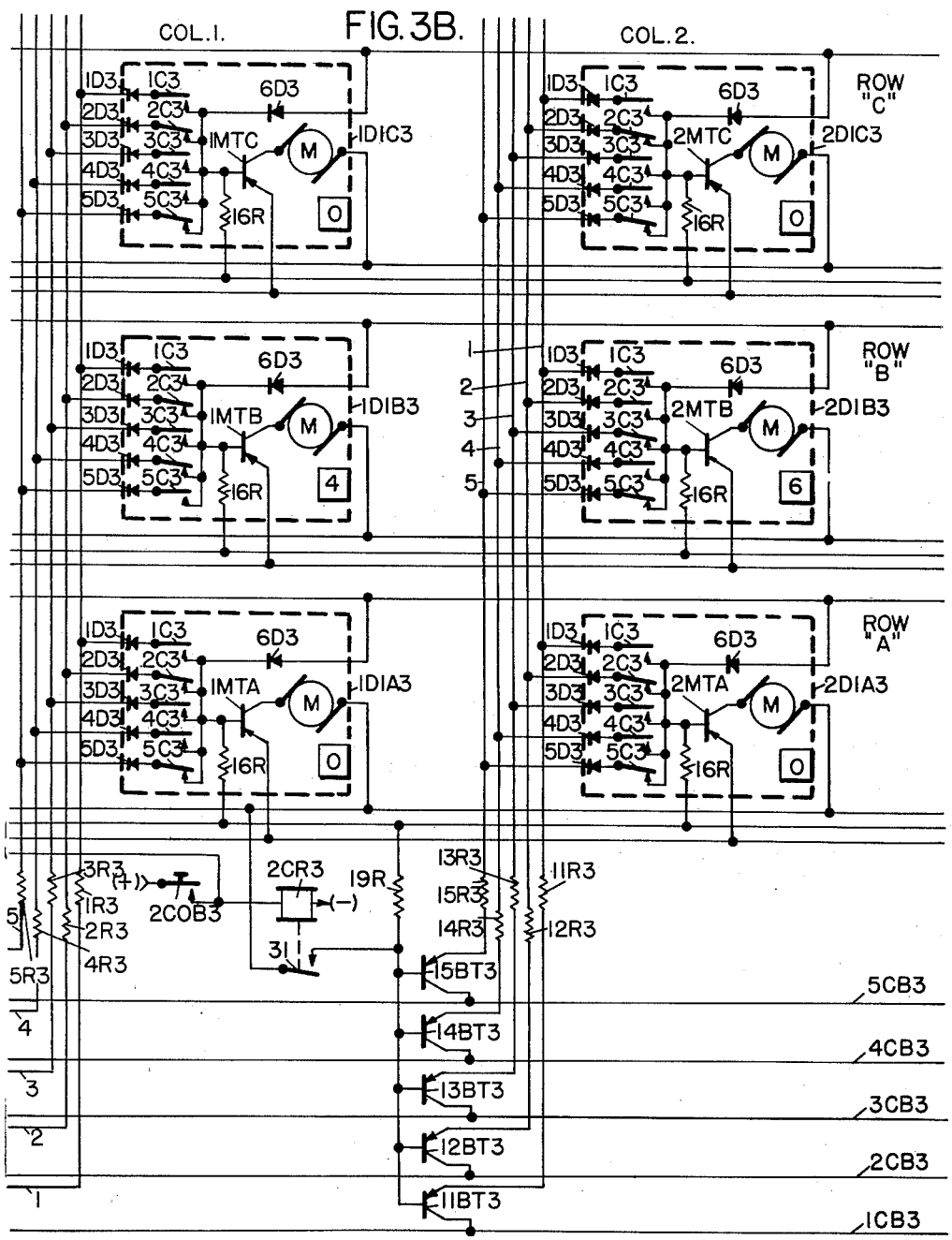

These indicators may be of any suitable type, but for convenience they are assumed to be of the general type shown in the G. E. Marsh Patent No. 2,959,773, granted on November 8, 1960. Such indicator is driven by its own electric motor to its different positions and is provided commutator contacts which are constructed to be opened and closed in different code combinations. Obviously, such indicators may have the appropriate gear structures and contact arrangements as desired for the particular system in which they are to be used. In accordance with the present invention, it is contemplated that the indicator employed in the system disclosed in FIGS. 3A and 3B, is of the multiple position type having contacts closed in code combinations different from that shown in said patent application. The commutators of the above mentioned Marsh patent provide for a relatively large number of code combinations; but the present invention proposes to employ for the purposes of the particular embodiment here shown an indicator structure which provides ten display positions. A particular commutator arrangement suitable for use herein has been shown in detail in the N. B. Coley U.S. patent application Ser. No. 763,493, filed September 26, 1958, and a similar structure has also been shown in the copending U.S. patent application of W. D. Maynard, Ser. No. 763,569, filed September 26, 1958. Although the present embodiment discloses a ten position indicator for the purposes of discussion of the present invention, it is to be understood that an indicator with a different number of positions such as shown in the above mentioned Maynard application Ser. No. 763,569, may be employed if desired. It should be apparent that the particular number of positions of the indicator may be selected as desired with the number of buses and like controls provided accordingly.

Each of these display indicators includes beside its motor M a transistor unit MT and an associated resistor R. More specifically, the indicator 1DIA3 includes transistor 1MTA and resistor 16R.

Each of these indicators is assumed to be of the ten position type which operates to its different positions by a motor M through suitable reduction gearing which operates the display element and the commutator or contact portions. The commutator portions have brushes which in effect provide five contacts as diagrammatically illustrated in FIG. 3B for each of the indicators. These contacts assume different positions for each of the different positions of the indicator in code combinations. In brief, the combinations are so chosen that to operate an indicator requires that three buses be energized for each of the combinations selected for the ten positions; and also two buses are left deenergized for each of such ten positions. This is shown in the code table of FIG. 1C.

In the code table of FIG. 1C, the (+) symbol is used to indicate the bus wires that must be energized to operate the indicator to a particular desired position; and the symbol (0) represents the particular bus wires for any particular position which are left deenergized. When bus wires are energized in a particular combination, the indicator which is being operated continues such operation until its contacts corresponding to those energized bus wires are opened and the remaining contacts are closed. Thus, in effect, the symbols (+) in the code table of FIG. 1C also indicate that for any particular position, the corresponding contacts of an indicator are open.

Also, the ten different positions of the indicator have been represented in the code table of FIG. 1C as numerals, and these numerals may also be displayed by the indicator in corresponding positions; but it should be understood that letters or any other desired symbols may be used on the display tape of the indicators as may be desired.

The buses 1, 2, 3, 4 and 5 are connected through five diodes 1D3, 2D3, 3D3, 4D3 and 5D3 respectively to the commutator contacts of the indicator. These diodes are for the purpose of preventing feed-around circuits, as will be later discussed.

An additional diode 6D3 is employed for each indicator to prevent feed-around circuits in connection with the read-out and read-in operations subsequently to be explained.

The control buses 1CB3, 2CB3, 3CB3, 4CB3 and 5CB3 may be energized in the combinations shown in the code table of FIG. 1C either by the manually operable buttons 1B3, 2B3, 3B3, 4B3 and 5B3, or by a suitable code input control means. When these control buses are thus energized in accordance with the desired position for some indicator either in column 1 or in column 2, the appropriate column relay such as relay 1CR3 is energized either by the manual operation of the button 1COB3 or appropriate code control. The particular row is again selected by the operation of an appropriate read-in contact, such as the manually operable contact RIB3 which may also be automatically closed by suitable automatic control means if desired. In any event, regardless of whether the inputs and indicator selections are effected manually or by automatic control means, the circuits are appropriately maintained until the selected indicator has completed its operation, as will be discussed later.

For the purpose of transferring the position of one indicator to another indicator, a transfer button TB3 is shown as being manually operable. Likewise, a read-out button, such as button ROA3 for row A may be operated to have the positions of the indicators 1DIA3 and 2DIA3 transferred to the indicators 1DIC3 and 2DIC3 respectively. To accomplish this the read-in button RIC3 also has to be operated. Again it should be noted that the read-in and read-out contacts may be controlled by suitable automatic means concurrently with the operation of the transfer button TB3 which may also be controlled by automatic means. After the information has been transferred from one row to another row, the row from which such information has been transferred may be returned to zero or a blank position, or may be operated to display new information all being dependent upon the desired operation.

A number of P-N-P type transistors are provided to interconnect the column buses with the main control buses 1CB3, 2CB3, etc. Each of these bus transistors BT is connected to its control bus CB through its collector. The emitter of each bus transistor BT is connected to its corresponding column bus. All bus transistors BT associated with a particular set of column buses have their bases connected by means of a common wire which is supplied with appropriate control potentials.

GENERAL FUNCTIONS OF TRANSISTORS IN FIGS. 3A AND 3B WITH REFERENCE TO FIG. 4

The above description of FIGS. 3A and 3B with regard to the structure involved in a posting and transfer system employing transistors for the purpose of reducing the control energy and for simplifying the contact arrangement. Before considering the operational characteristics of such an organization, it is believed to be expedient to consider the general functions of the different groups of transistors with regard to a single bus and its related circuits. Thus, such a description will be given with reference to FIG. 4, and more particularly considering the potentials applied to the respective transistors from a common source 75 for illustrating how the control contacts have their functions repeated and effectuated through transistor control with a minimum of control current and a simplification of contact arrangement.

Figure 4:
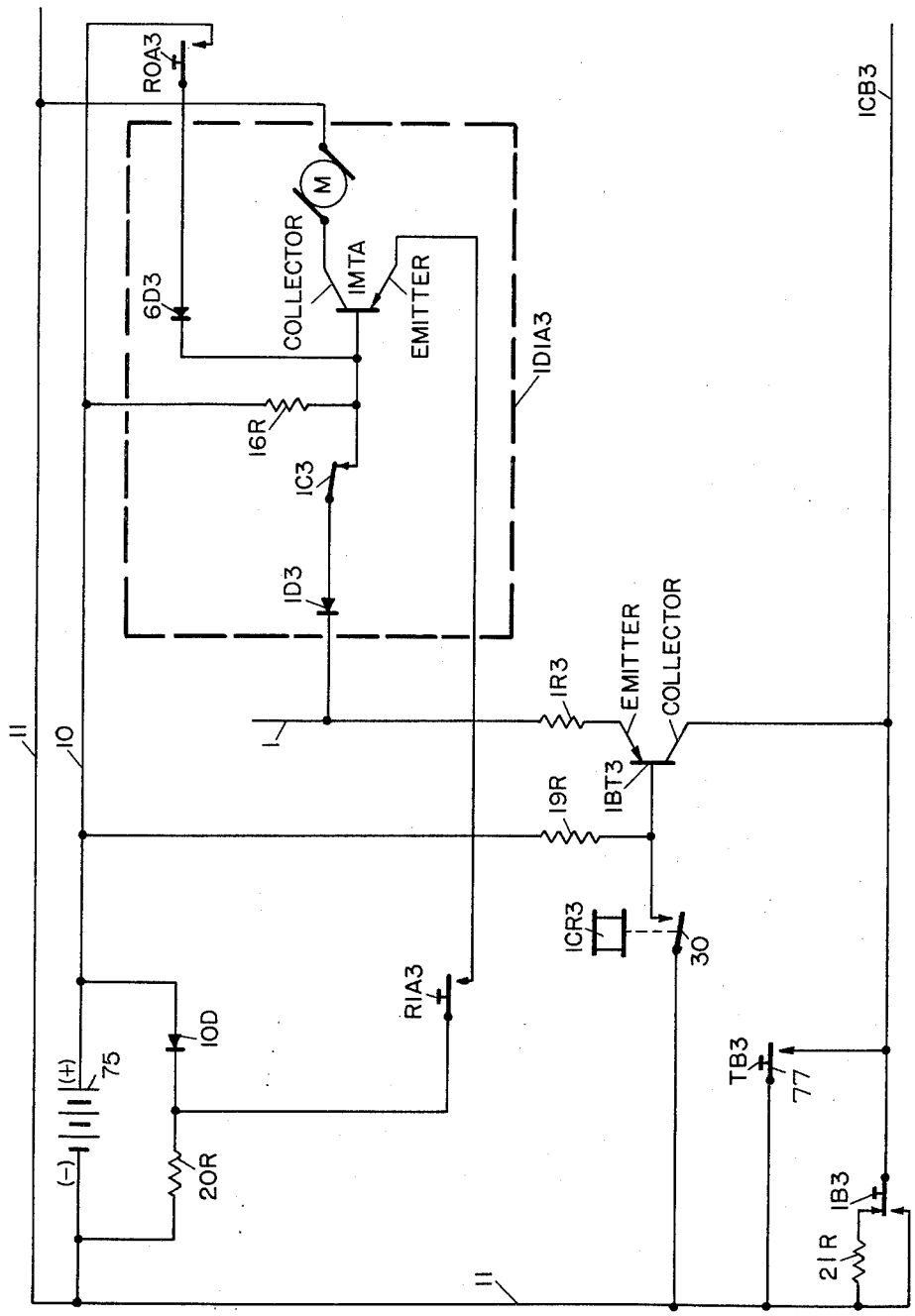
FIG. 4 is an abbreviated schematic illustration of FIGS. 3A and 3B to simplify certain of its circuits for the purposes of explanation.

In the consideration of the present disclosure, the transistors are assumed to be of the P-N-P type although it is to be understood that various other types can be employed if desired with appropriate modifications of the circuits. Referring to FIG. 4, the bus transistor 1BT3 is shown as having its collector connected to the control bus 1CB3. The base of the transistor 1BT3 is connected through a resistor 19R to the positive bus 10. In the illustration of FIG. 4, it is assumed that the commutator contact 1C3 of the indicator 1DIA3 is closed; but it should be understood that, under some other conditions for this contact, or for some conditions of other contacts on this indicator, such contact could be considered in an open position. However, under the conditions illustrated contact 1C3 is closed so that the emitter of the transistor 1BT3 is connected to the positive bus 10 through resistor 1R3, diode 1D3, contact 1C3, and resistor 16R. Under this quiescent state, there is a relatively small current flowing through the transistor 1BT3 from its emitter to its collector which circuit includes the resistor 21R and bus contact 1B3 to the negative bus 11. This small current is of such a value that the base of the transistor 1MTA is substantially positive. The motor M has one terminal connected to the collector of this transistor 1MT and its other terminal connected to the negative bus 11. For this reason there is a very small current flow from the base of transistor 1MTA to the collector and through the motor but this is insufficient to cause its operation. In order to provide that the bus control button 1B3 may have selective control of the energy supplied to the column bus 1, it is necessary to render the bus transistor 1BT3 active or energized. This is effected by causing the operation of the column relay 1CR3 and the closure of front contact 30. This closure of contact 30 produces a current flow through resistor 19R from the positive bus 10 to the negative bus 11 and thus effects the direct application of negative potential to the base of the transistor 1BT3.

With the bus control button 1B3 in its normal position illustrated, the collector of the transistor 1BT3 is connected through resistor 21R to the negative bus 11. Under such circumstances, there is still a relatively small current flow between the emitter and collector of the bus transistor 1BT3 so that insofar as its affect on the motor transistor 1MTA is concerned, there is substantially no change. Under such circumstances, the operation of the read-in button RIA3 applies positive potential to the emitter of the motor transistor 1MTA but due to the presence of the positive potential on the base of this transistor, there is still insufficient current flow through the motor M to cause its operation.

On the other hand, if the code combination calls for the actuation of the button 1B3, then the collector of the bus transistor 1BT3 is connected directly to the negative bus 11 which provides a substantial current flow between the emitter and collector of this transistor 1BT3, and thus produces the appropriate potential drops in the resistors 1R3 and 16R to change the potential on the base of the transistor 1MTA to a more negative value. This renders the transistor 1MTA in an active or energized condition under which it passes sufficient current between its emitter and collector to cause the operation of the motor M.

It is, of course, understood that the appropriate operations of the button 1B3 and read-in button RIA3 are provided as will be presently described for the complete organization shown in FIGS. 3A and 3B of the drawings.

Let us assume that the quiescent state or condition of the circuit organization is normal as above described and that it is desired to transfer the existing display position of indicator 1DIA3 to another display indicator disposed in the same column. As has been stated heretofore, the closed commutator contact 1C3 is indicative of a control bus which during posting operations had no energy applied to it. During posting operations, then, the circuit associated with the contact 1C3 did not provide current for the motor M. During transfer operation, the motor M should remain deenergized. This is accomplished by leaving the motor transistor 1MTA in its deenergized condition.

On the other hand, it is desirable that the bus transistor 1BT3 be in its energized condition during transfer operation. This is effected by actuation of transfer button TB3 and read-out button ROA3. Such actuation of button TB3 connects the collector of bus transistor 1BT3 directly to the negative bus 11 through contact 77 while the positive bus 10 normally connected to the base of transistor 1BT3 through resistor 19R is also connected to the negative bus 11 through front contact 30 of relay 1CR3 as a result of operation of transfer button TB3. This connection is effective to provide the base of bus transistor 1BT3 at a more negative potential than during the quiescent state.

Actuation of button ROA3 is effective to connect the positive bus 10 to the base of motor transistor 1MTA through diode 6D3. The positive energy (+) applied directly to the base of motor transistor 1MTA is effective to sustain the deenergized condition of motor M during the transfer operation. Positive bus 10 is also connected to the emitter of the bus transistor 1BT3 through diode 6D3, commutator contact 1C3, diode 1D3 and the resistor 1R3. Under these circumstances, a substantial current will flow between the emitter and collector of the bus transistor 1BT3. This current flow is effective to cause a potential drop in resistor 1R3 located in the emitter circuit of bus transistor 1BT3. This potential drop occurs across resistor 1R3 so that the terminal of resistor 1R3, which is at a more positive potential, is common to the diodes 1D3 of all the display indicators in the column.

OPERATION OF FIGS. 3A AND 3B

Keeping the above general description of the transistor operation in mind, reference will now be made to FIGS. 3A and 3B to consider the operation with regard to the posting of information in the various display indicators of the panel and the transfer of such information from one row of such panel to another row of the same panel.

In the quiescent state of the circuit organization of FIGS. 3A and 3B, the base of each bus transistor BT is connected to the positive (+) side of a common energy source 75 through a resistor such as resistor 19R. In this condition also, the collector of each bus transistor BT is connected to the negative (−) side of the common energy source 75 through a button, such as button 2B3 and a resistor, such as resistor 22R. The emitter of each of these transistors BT is connected to the positive (+) side of the common energy source 75 through a resistor such as resistor 2R3, a diode such as 2D3, a contact such at 2C3, and a resistor such as 16R. These connections are effective to provide limited energy available to the bus transistor electrodes so that a small amount of current will flow through each transistor BT associated with a closed commutator contact during quiescent conditions; but, for those transistors BT associated with open commutator contacts, there is no current flow.

It should be noted that there are always two contacts closed for each indicator for each of its positions, as can be observed from consideration of the code table of FIG. 1C. This means that two of the contacts for each indicator will connect the emitters of the associated bus transistors BT through their respective resistors R to the base of the motor transistors MT. More specifically, considering the indicator 1DIC3, assumed to be in position 0, contacts 2C3 and 5C3 are closed connecting the emitters of bus transistors 2BT3 and 5BT3 respectively to the base of the transistor 1MTC. This allows a small current to flow through resistor 16R to the positive bus 10. This results in causing the base of the transistor 1MTC to be substantially at a positive potential because the resistor 16R is in series with the resistors 2R3 and 5R3. (This, it will be observed, is in contradistinction to the operative condition where there is a greater current flow through these resistors and the resultant potential on the base of transistor 1MTC is of a more negative value.)

During a read-in operation, three of the buttons 1B3, 2B3, 3B3, etc., are actuated in accordance with the Code Table of FIG. 1C to obtain a particular position for any selected indicator. Likewise, a read-in button, such as button RIC3, is actuated to select the row containing the indicator desired to be positioned. A column button, such as button 1COB3, is actuated in order to select a column and thus effect the selection of a particular indicator where there is coincidence between the selected row and the selected column.

Let it be assumed that it is desired to cause indicator 1DIC3 to display the digit 3 instead of displaying a digit 0 as shown. Button RIC3 is actuated, which actuation is effective by reason of its connection in the circuit including resistor 20R and diode 10D to provide a positive (+) potential on the emitter of transistor 1MTC in readiness for the change in potential on its base from a positive potential to a negative potential to energize transistor 1MTC. Buttons 3B3, 4B3 and 5B3 are actuated, which is effective to connect the collectors of the bus transistors 3BT3, 4BT3 and 5BT3 associated with column 1 directly to the negative bus 11 of the energy source 75. This connection to the negative energy source 75 is effective to preliminarily condition the three bus transistors 3BT3, 4BT3 and 5BT3 in readiness for the application of a negative potential to their bases. This is accomplished by the actuation of the button 1COB3 which in turn energizes the column relay 1CR3 to close front contacts 30 of relay 1CR3 and complete a circuit from the common negative energy source 75 to the base of the bus transistors BT for column 1. With these energies so applied, the three transistors 3BT3, 4BT3 and 5BT3 are energized at different times in accordance with the closure of the commutator contacts 3C3, 4C3 and 5C3 respectively. This activation or energization of the bus transistors BT causes the preliminarily conditioned motor transistor 1MTC to be activated or energized to cause operation of its associated motor M to drive the display indicator 1DIC3 through its different positions.

These commutator contacts 3C3, 4C3 and 5C3 will open and close in combinations until such time that the display indicator is operated to the particular position called for in which position all three are opened. More specifically, each one of these transistors 3BT3, 4BT3 and 5BT3 in accordance with their associated closed commutator contact 3C3, 4C3 and 5C3 is effective to increase the potential drop across resistor 16R which thereby decreases the positive potential on the base of motor transistor 1MTC (i.e. renders potential more negative). Since the emitter has been previously connected to a positive (+) source through button RIC3 and since the collector of transistor 1MTC is connected to the common negative (−) energy source 75 through motor M, the negative potential applied to the base of transistor 1MTC is effective to cause a current flow from emitter to collector of sufficient size to cause the motor M to operate. Until such time as the commutator contacts for position 3 become open, the negative potential will be applied to the base of transistor 1MTC. When these contacts, i.e. 3C3, 4C3 and 5C3, all become open, the current flow through resistor 16R is decreased in accordance with the current flow through transistors 1BT3 and 2BT3 and their associated closed commutator contacts 1C3 and 3C3. This small current flow is effective to decrease the voltage drop across resistor 16R which effectively applies a positive potential to the base of transistor 1MTC. This is effective to reduce the current flow through transistor 1MTC to a value which is insufficient to operate motor M.

Let it be assumed that it is desired to operate the display indicator 2DIC3 to position 7. The operation will be similar to that of indicator 1DIC3 except, of course, that the buttons 1B3, 2B3 and 5B3 will be actuated. The bus transistors 1BT, 2BT, and 5BT are conditioned for column 2. The button 2COB3 is actuated which causes relay 2CR3 to be energized. The negative (−) energy is applied to the bases of these bus transistors through contact 31. The operation of display indicator 2DIC3 to position 7 is similar to that of indicator 1DIC3.

The transfer operation will now be considered. To transfer the positions of the display indicators 1DIC3 and 2DIC3 of row C to the indicators 1DIA3 and 2DIA3 respectively of row A, it is necessary to establish control conditions by the operation of a transfer button TB3 common to the entire panel, by the actuation of the read-out button ROC3 for the row having the information selected to be transferred, and by the actuation of the read-in button RIA3 for the row to which the information is to be transferred.

The actuation of the transfer button TB3 closes contacts 77, 78, 79, 80 and 81 for energizing all of the control buses 1CB3, 2CB3, 3CB3, etc. In addition, the actuation of the transfer button TB3 closes contacts 82 and 83 for energizing the column relays 1CR3 and 2CR3. If there were additional columns, their column relays would also be energized. Thus, all of the bus transistors BT for each of the columns of the panel are conditioned both on their bases and on their collectors for supplying operative energy to all the buses of each column set of buses.

As above mentioned, each indicator has two contacts which are closed, the particular contacts involved being dependent upon the position it then assumes. The particular contacts can be determined from the code table of FIG. 1C for each of its different positions. These two closed contacts of each indicator of row C are rendered effective to shunt their respective associated column buses by reason of the operation of the read-out button ROC3. This is apparent from the circuits of FIG. 3B where a common connection from button ROC3 is provided through the diodes 6D3 of each indicator.

This shorting of two column buses out of five produces potential drops in the bus resistors for corresponding buses. More specifically, the commutator contacts 1C3 and 2C3 for indicator 1DIC3 are closed since it is now assumed that this indicator is standing in its position 3. Thus, potential drops are produced in resistors 1R3 and 2R3. Such potential drops render these buses ineffective for acting on the motor transistor 1MTA for indicator 1DIA3; but the other buses, i.e. 3, 4 and 5, are conditioned to properly act on the base of transistor 1MTA, in a manner above described for causing the operation of its associated motor M.

A similar operation, of course, occurs with regard to indicator 2DIA3, but in this instance the buses 3 and 4 are rendered ineffective due to the potential drops found in the resistors 13R3 and 14R3 as caused by the contacts 3C3 and 4C3 of indicator 2DIC3.

When the information has thus been completely transferred from row C to row A, the control buttons can be released. In this connection, it should also be understood that these buttons may be operated automatically but for convenience in the disclosure it is considered that they are operated manually.

In connection with the above description, it will be noted that there are a number of rows of indicators on the panel which are inactive during this transfer operation. They remain inactive due to the fact that their associated read-in buttons are not operated. However, it should be observed that the resistors 16R are of a proper value to prevent excessive current flow on the associated buses because such current flow should not produce potential drops in the bus resistors 1R3, 2R3, etc. corresponding to the potential drop produced by the closed contacts for those indicators having their read-out button operated.

*Summary*

From the above description and consideration of the several forms of the present invention, it will be apparent that the present invention contemplates the provision of a posting and transfer system in which all operations are effected over the same sets of buses in a direct and positive manner without the use of intermediate switching contacts. It will also be apparent that this is accomplished regardless of whether the display indicators employed are controlled over bus systems which are coded or which are directly representative of the positions to which the indicators are to be operated.

One form of the invention discloses how transistors have been incorporated into the posting and transfer system to reduce the current requirements both for the protection of the contacts involved in the display indicators and the control contacts; and also to make it possible to use smaller sizes of wire for the buses. In addition, these transistors in certain instances take the place of circuit isolating contacts.

Having described three different forms of posting and transfer systems as three specific embodiments of the present invention, it is desired to be understood that these forms have been selected to facilitate in the disclosure of the invention rather than to limit the number of forms which it may assume; and, it is to be further understood that various modifications, adaptations and alterations may be applied to the specific forms shown to meet the requirements of practice, without in any manner departing from the spirit or scope of the present invention. What we claim is:

1. In a posting and transfer system for display indicators, a plurality of display indicators each including an electro-responsive means and changeable contact means, each said electro-responsive means governing the operation of its indicator to its different positions, and said changeable contact means for each indicator being operative to positions characteristic of the different positions of that display indicator, a plurality of control buses, a corresponding plurality of diodes for each indicator, circuit means connecting one terminal of said electroresponsive means to each indicator to the changeable contacts of that indicator and then connecting each contact to its respective control bus with each such connection including one of said diodes for that indicator, a plurality of resistors corresponding to the plurality of buses, input means for at times selectively energizing said plurality of buses from one terminal of a source of energy in accordance with the different positions to which said indicators may be operated when it is desired to operate any particular indicator to any particular position, transfer means for at other times energizing all of said plurality of control buses through their respective ones of said resistors, read-out means for each indicator for at said other times being effective for connecting the opposite terminal of said source of energy to said one terminal of said electroresponsive means connected to said changeable contacts of that indicator, and read-in means for each indicator for connecting the other terminal of its said electroresponsive means to the opposite terminal of said source of energy for causing such indicator to respond to the selective energization of said control buses at times energized by said input means and to at said other times respond to the energization of said buses while said transfer means and said read-out means are effective.

2. In a posting system for display indicators, a plurality of display indicators arranged in rows and columns each including an electroresponsive means and changeable contact means, each said electroresponsive means for governing the operation of its indicator to its different positions, and said changeable contact mean for each indicator being operative to positions characteristic of the different positions of each display indicator where at least two contacts therefor are in closed position in each of said different positions, a plurality of control buses, a corresponding plurality of column buses individual to the columns of said indicators, a corresponding plurality of diodes for each indicator, circuit means connecting one terminal of said electroresponsive means of each indicator to the changeable contacts of that indicator and then connecting each contact to its respective column bus with each such connection including one of the diodes for that indicator, column relay means for at times connecting said column buses for each column of indicators to their corresponding control buses, means for selectively energizing said plurality of control buses at different times in accordance with the positions to which it is desired to operate any particular indicator of any particular column, circuit means for selectively energizing at different times said column relays to cause said control buses for that column to be connected to corresponding column buses, and means associated with each indicator for connecting the other terminal of its electroresponsive means to the opposite energy source to effect operation of that indicator to a position corresponding to the then existing selective energization of said control buses while said column relay for its column is energized.

3. In a posting system for display indicators, a plurality of display indicators arranged into rows and columns and each indicator being operable to different selected positions, changeable contacts for each indicator including at least two closed contacts in each of said different selected positions, a set of diodes for each indicator, a set of control buses for each column of indicators, circuit means for each of said indicators for connecting the changeable contacts of that indicator to the buses for that column through a diode individual to each bus, means for at different times distinctively energizing the buses of each column corresponding to the desired position of a selected one of the indicators for that column, electroresponsive means for each indicator governing the operation of that indicator, circuit means connecting said electroresponsive means for each indicator to its changeable contacts to render it subject to the selective energization of the buses of its column, and row selection means connecting all of the electroresponsive means for the several indicators of that row together to render them controllable in accordance with the selective energization of the buses for their respective columns.

4. In a transfer system adaptable to a plurality of display indicators each including an electroresponsive means and changeable contact means, each said electroresponsive means for governing the operation of its indicator to its different positions, and said changeable contact means for each indicator being operative to positions characteristic of the different positions of each display indicator, a plurality of control buses, a corresponding plurality of diodes for each indicator, circuit means connecting one terminal of said electroresponsive means of each indicator to the changeable contacts of that indicator and then connecting each contact to its respective control bus with each such connection including one of the diodes for that indicator, first means for applying one energy source to the other terminal of said electroresponsive means of each indicator, second means for applying one energy source to said one terminal of said electroresponsive means of each indicator, a plurality of resistors individual to the buses, third means common to one side of the resistors for applying an opposite energy source to that side of all the resistors, said resistors being effective in accordance with one condition of said second means, said third means and the changeable contacts of a particular indicator to energize the buses in a manner characteristic of the positions of the changeable contacts of that indicator, said energization of the buses being effective in accordance with one condition of said first means for any other indicator to cause such indicator to assume a corresponding position.

5. In a transfer system adaptable to a plurality of display indicators arranged in rows and columns each including an electroresponsive means and changeable contact means, each said electroresponsive means for governing the operation of its indicator to its different positions, and said changeable contact means for each indicator being operative to positions characteristic of the different positions of each display indicator, a plurality of control buses, a corresponding plurality of buses individual to the columns of said indicators, a corresponding plurality of diodes for each indicator, circuit means connecting one terminal of said electroresponsive means of each indicator to the changeable contacts of that indicator and then connecting each contact to its respective column bus with each such connection including one of the diodes for that indicator, segregation means for selectively connecting the buses of each column of indicators to their corresponding control buses, first means for applying one energy source to the other terminal of said electroresponsive means of each indicator in any particular row, second means for applying one energy source to said one terminal of said electroresponsive means of each indicator in any particular row, a plurality of diodes associated with said second means with one of said diodes being provided for each indicator, a plurality of resistors individual to each of the buses of each of the columns of indicators, third means common to one side of all the resistors for applying an opposite energy source to that side of all the resistors, said resistors being effective in accordance with one condition of said second means of a particular row, said third means and the changeable contacts of the particular indicators in that row to energize the column buses in a manner characteristic of the positions of the changeable contacts of those indicators in that row, said energization of the column buses being effective in accordance with one condition of said first circuit means in relation to another row to cause the indicators of that row to concurrently assume positions corresponding to the positions of the particular indicators in their respective columns.

6. In a posting and transfer system for a plurality of display indicators arranged in rows and columns, each indicator including changeable contacts and electroresponsive means for governing the operation of that indicator to its different positions and concurrently operating said changeable contacts to positions characteristic of the different positions of that display indicator, a plurality of control buses for each column, a corresponding plurality of diodes for each indicator, circuit means for each indicator for connecting one terminal of its said electroresponsive means through its changeable contacts and its diodes to said control buses, a plurality of resistors, one for each of said control buses, means for selectively energizing the control buses for any column in accordance with the desired position of any indicator in that column, read-in means for rendering said electroresponsive means for the indicators of any row responsive to the energization of their control buses for any column, circuit means for rendering the selective energization of the buses for any column effective at a different time than the selective energization of the other columns, other circuit means for energizing all of the buses for all of the columns through their respective resistors, read-out means associated with the indicators of each row for causing such indicators of that row to selectively apply an opposite energy to the buses of each column in accordance with their then existing positions, whereby potential drops are selectively developed in the resistors for the buses of any column in accordance with the indicators of that particular row having its read-out means operated and whereby the operation of said read-in means for any other row causes the transfer of information from the indicators of said particular row to such other row.

7. In a posting system for display indicators, a plurality of display indicators arranged in rows and columns each including an electroresponsive means and changeable contact means, each said electroresponsive means for governing the operation of its indicator to its different positions, and said changeable contact means for each indicator being operative to positions characteristic of the different positions of each display indicator, a plurality of control buses, a corresponding plurality of buses for each column of indicators, a corresponding plurality of diodes for each indicator, circuit means connecting one terminal of said electro-responsive means of each indicator to the changeable contacts of that indicator and then connecting each contact to its respective bus with each such connection including one of the diodes for that indicator, transistor segregation means for selectively connecting the control buses to their corresponding buses of any particular column, means for selectively energizing said plurality of control buses and each corresponding plurality of column buses in accordance with one condition of the transistor segregation means for any particular column in accordance with the different positions to which the indicators of any particular column may be operated when it is desired to operate any particular indicator of that column to any particular position, and means associated with each indicator of any particular row of indicators for connecting the other terminals of each of the electroresponsive means to the opposite source of energy to effect operation of any electroresponsive means in that row in accordance with one condition of the transistor segregation means to a position corresponding to then existing selective energization of said control buses.

8. In a posting system for display indicators; a plurality of display indicators each including an electroresponsive means, changeable contact means and transistor control means; each said electroresponsive means for governing the operation of its indicator to its different positions in accordance with one condition of its transistor control means; said changeable contact means for each indicator being operative to positions characteristic of the different positions of each display indicator; a plurality of control buses; a corresponding plurality of diodes for each indicator; circuit means connecting one terminal of said electroresponsive means of each indicator to the changeable contacts of that indicator through the transistor control means and the other terminal to one source of energy; each of the changeable contacts of each indicator being connected to its respective bus with each such connection including one of the diodes for that indicator; input means for selectively energizing said plurality of control buses with one source of energy in accordance with the different positions to which it is desired to operate any particular indicator of the plurality of indicators; and selection means associated with each indicator for connecting the transistor control means to the opposite source of energy to effect operation of the electroresponsive means of that indicator to a position corresponding to the then existing selective energization of said control buses.

9. In a posting system for display indicators, a plurality of display indicators arranged in rows and columns each including an electric motor and a plurality of changeable contacts, each said motor for governing the operation of its indicator to its different position, and the changeable contacts for each indicator being operative to positions characteristic of the different positions of each display indicator, a plurality of control buses, a corresponding plurality of buses for each column of indicators, circuit means connecting one terminal of said electric motor of each indicator to the changeable contacts of that indicator and then connecting each contact to its respective bus, a relay for each column of indicators including a contact for each control bus for connecting the buses of each column of indicators to their corresponding control buses, input means for selectively energizing said plurality of control buses and each corresponding plurality of column buses in accordance with the energized condition of their associated relays by connection to one energy source in accordance with the different positions to which said indicators may be operated when it is desired to operate any particular indicator of any particular column to any particular position, and selection means associated with each indicator for connecting the other terminal of its electric motor to the opposite energy source to effect operation of that indicator to a position corresponding to the then existing selective energization of said control buses.

10. In a posting system for display indicators: a plurality of display indicators arranged in rows and columns each including an electric motor, a plurality of changeable contacts, a resistor and transistor control means; each said electric motor for governing the operation of its indicator to its different positions in accordance with the energized condition of its transistor control means; and said plurality of changeable contacts for each indicator being operative to positions characteristic of the different positions of each display indicator; a plurality of control buses; a corresponding plurality of buses for each column of indicators; a corresponding plurality of diodes for each indicator; circuit means connecting one terminal of said electric motor of each indicator to the transistor control means of that indicator with said transistor control means being connected to the changeable contacts of that indicator with each contact being connected to its respective bus with each such connection including one of the diodes for that indicator; transistor segregation means including a transistor for each column bus for connecting the control buses to their corresponding buses of any particular column; each of said transistors included in the transistor segregation means being biased in its deenergized condition for permitting a small current flow through the resistors individual to the indicators; such small current flow being effective to cause the transistor control means of each indicator to remain in its deenergized condition; input means for selectively energizing said plurality of control buses and each corresponding plurality of column buses in accordance with the energized condition of the transistors individual to the column buses for any particular column in accordance with the different positions to which the indicators of any particular column may be operated when it is desired to operate any particular indicator of that column to any particular position; and selection means associated with all of the indicators of any particular row of indicators for effecting the energization of the transistor control means of any particular indicator in that row of indicators to effect operation of the electric motor of that indicator to a position corresponding to the then existing selective energization of said control buses.

11. In a control system for display indicators, a display indicator having changeable contacts, a motor for driving said indicator and contacts to their different positions, and a transistor, a plurality of control buses, circuit means for connecting said transistor through said changeable contacts to said control buses to render said transistor capable of causing operation of said motor when potential is received from any one of said buses, and means for selectively energizing said buses in accordance with the position to which it is desired to operate said indicator.

12. In a control system for display indicators, a source of energy, a plurality of control buses, a display indicator having changeable contacts, a motor for operating said indicator and contacts to its different positions, a transistor, circuit means connecting said transistor, said source of energy, and said motor to be normally ineffective to operate said motor but connected to said control buses through said changeable contacts to be rendered effective to operate said motor whenever control potential is received over said buses, said contacts being effective to prevent control energy from being applied from said buses to said transistor when said indicator and contacts are operated to a position corresponding to the selective energization then existing on said control buses, and means for selectively energizing said control buses in accordance with any desired position of said indicator.

13. In a control system for display indicators, a display indicator operable to a predetermined number of different positions, a plurality of changeable contacts for said indicator operable to opened and closed conditions in different code combinations corresponding in number to said predetermined number, a motor for driving said indicator and said changeable contacts to their different positions, a transistor, a plurality of control buses, circuit means for connecting said transistor through said changeable contacts to said control buses to normally render said transistor ineffective to operate said motor but to be effective to cause operation of said motor when control potentials are received from said buses through said changeable contacts, means for selectively energizing said buses in code combinations corresponding to the different positions to which said indicator may be operated, said code combination being selected to leave at least one of said control buses without operative potential, and said code combinations of said contacts being effective for each position to leave a contact closed only for such control buses as are left deenergized for such position.

14. In a control system for display indicators, a plurality of display indicators each having changeable contacts operable to different positions and a motor for driving said indicator and its contacts to their different positions, a transistor for each indicator, a plurality of control buses, circuit means for each indicator for connecting said transistor for that indicator through said changeable contacts to said control buses to render said transistor capable of causing operation of said motor when potential is received from any one of said buses, means for selectively energizing said buses in accordance with the position to which it is desired to operate any one of said indicators, and means operative to render said indicators selectively responsive one at a time to the selective energization of said control buses.

15. In a posting system for display indicators, a plurality of display indicators arranged in rows and columns, each having a plurality of contacts changeable in position and a driving means for operating said contacts to different positional combinations characteristic of the indicator displays, a plurality of buses for each column of indicators, circuit means for connecting corresponding contacts for all indicators in a column to a particular bus of the buses for that column of indicators, a plurality of control buses corresponding in number to each plurality of column buses and selectively connectable to each plurality of buses, circuit means for similarly connecting all driving means for respective indicators in any one row to one source of energy, means for at times distinctively energizing the selected buses for a column of indicators with the opposite source of energy, and other means common to each connection of a contact to its particular bus for each indicator at times effective to prevent erroneous energization of buses other than those buses selectively energized for a particular column of indicators and at other times to prevent erroneous energization of buses for those columns of indicators not selectively energized.

16. In a posting system for display indicators, a plurality of display indicators arranged in rows and columns, each having a plurality of contacts changeable in position and a driving means for operating said contacts to different positional combinations characteristic of the indicator displays, a plurality of buses for each column of indicators, circuit means for connecting corresponding contacts for all indicators in a column to a particular bus of the buses for that column of indicators, a plurality of control buses corresponding in number to each plurality of column buses and selectively connectable to each plurality of buses, conditioning means with each row of indicators for selectively causing one side of all driving means in the row of indicators to be placed at one potential while permitting the other sides thereof to be placed at an opposite potential only according to one position of at least one contact and the energization of the bus corresponding thereto for an indicator in the row, means for at times distinctively energizing the selected buses for a column of indicators with said opposite potential, and other means common to each connection of a contact to its particular bus for each indicator at times effective to prevent buses other than those buses selectively energized from being erroneously energized and at other times to prevent buses for those columns of indicators not selectively energized from becoming erroneously energized.

17. A posting system as defined in claim 10, wherein said transistor segregation means includes a relay for each group of transistors individual to the buses of a particular column, circuit means including a contact of the relay in its energized condition for each group of transistors for causing all of the transistors in the group to be biased to an operative condition only dependent upon the selective condition of said input means and the position of said changeable contacts.

18. In a posting and transfer system adaptable to at least two display indicators each including an electroresponsive means and changeable contact means in series connection, each said electroresponsive means for governing the operation of its indicator to its different positions, said changeable contact means for each indicator being operative to positions characteristic of the different positions thereof, a plurality of control buses, one side of said changeable contact means for each indicator being respectively connected to said buses, a plurality of resistors individual to the buses, input means adapted to apply one energy source to said plurality of control buses in different combinations including the combination where all such buses are energized, control means individual to each indicator adapted at times to connect said electroresponsive means for that indicator to the opposite energy source for causing the operation thereof to one of said different positions and at other times to shunt said electroresponsive means but to connect said changeable contact means to said opposite energy source, whereby the position of that indicator is indicated by the energization of said control buses according to potential drops in certain of said resistors.

19. A posting and transfer system as defined in claim 18, wherein at least two of said changeable contact means are closed in each of said different positions, a plurality of diodes for each indicator, one being connected between each control bus and the corresponding contact means, thereby insuring that only the desired control buses are energized with said one energy source.

20. A posting and transfer system as defined in claim 19, wherein one display indicator has substantially equal potentials on both sides of its electroresponsive means for maintaining such electroresponsive means deenergized, while the other display indicator is operated through its electroresponsive means to the positions represented by the position of said changeable contact means of said one indicator.

21. In a posting and transfer system adaptable to at least two display indicators each having changeable contacts, an electroresponsive means for each indicator for driving its indicator and the changeable contacts therefor to their different positions, and transistor control means, a plurality of control buses, a plurality of resistors individual to said control buses, circuit means for connecting said transistor control means on one side through said changeable contacts to said control buses and on the opposite side through said electroresponsive means to one energy source, input means adapted to apply one energy source to said plurality of control buses in different combinations including the combination where all such buses are energized, control means individual to each indicator adapted at times to connect said transistor control means to an opposite energy source to render said transistor control means capable of causing operation of said electroresponsive means when potential is received from any one of said buses and at other times to shunt said electroresponsive means but to connect said changeable contact means to said opposite energy source, whereby the position of that indicator is repeated by the energization of said control buses according to potential drops in certain of said resistors.

22. A posting and transfer system as defined in claim 21, wherein the transistor control means for one of said indicators is effective during the time that the changeable contacts for that indicator are connected to said opposite energy source to insure the electroresponsive means for that indicator remains inoperative.

References Cited in the file of this patent

UNITED STATES PATENTS

| | | |
|---|---|---|
| 2,074,066 | Wheeler | Mar. 16, 1937 |
| 2,618,706 | McCoy | Nov. 18, 1952 |
| 2,827,233 | Johnson | Mar. 18, 1958 |

FOREIGN PATENTS

| | | |
|---|---|---|
| 821,942 | France | Dec. 16, 1937 |